United States Patent [19]

Trayford, III et al.

[11] Patent Number: 4,544,386

[45] Date of Patent: Oct. 1, 1985

[54] FILTER CASSETTE

[75] Inventors: Charles Trayford, III; Jeffrey M. Petrizzi, both of Wilmington, Del.

[73] Assignee: Environmental Safety Products, Inc., Wilmington, Del.

[21] Appl. No.: 496,825

[22] Filed: May 23, 1983

[51] Int. Cl.[4] .............................................. B01D 50/00
[52] U.S. Cl. ....................................... 55/270; 55/503; 55/510; 73/28
[58] Field of Search ................. 55/270, 490, 503, 510, 55/511; 73/28, 432 PS

[56] References Cited

U.S. PATENT DOCUMENTS

| | | | |
|---|---|---|---|
| 2,701,030 | 2/1955 | Hazelton | 55/503 X |
| 3,693,410 | 9/1972 | Robrecht et al. | 73/28 |
| 3,957,469 | 5/1976 | Nebash | 55/270 |
| 3,983,743 | 10/1976 | Olin et al. | 73/28 |
| 4,178,794 | 12/1979 | Jugle et al. | 73/28 |
| 4,233,043 | 11/1980 | Catterson | 55/510 X |
| 4,314,831 | 2/1982 | Barbic | 55/503 X |
| 4,350,507 | 9/1982 | Greenough et al. | 55/270 |
| 4,382,808 | 5/1983 | Van Wormer et al. | 55/503 X |

Primary Examiner—Charles Hart
Attorney, Agent, or Firm—Connolly and Hutz

[57] ABSTRACT

A filter cassette for sampling of airborne substances comprising a body section having an air flow passageway that extends through the body section from an air inlet to an air outlet. A filter medium inside the body section is disposed across the air flow passageway for capturing airborne substances flowing through the passageway. The portion of the passageway directly downstream from the filter medium has a uniform frustoconical contour converging in the direction of flow. The air inlet comprises openings in the body section upstream from the filter medium, the openings being arranged to direct air into the air flow passageway normal to the direction of flow onto the filter medium.

14 Claims, 6 Drawing Figures

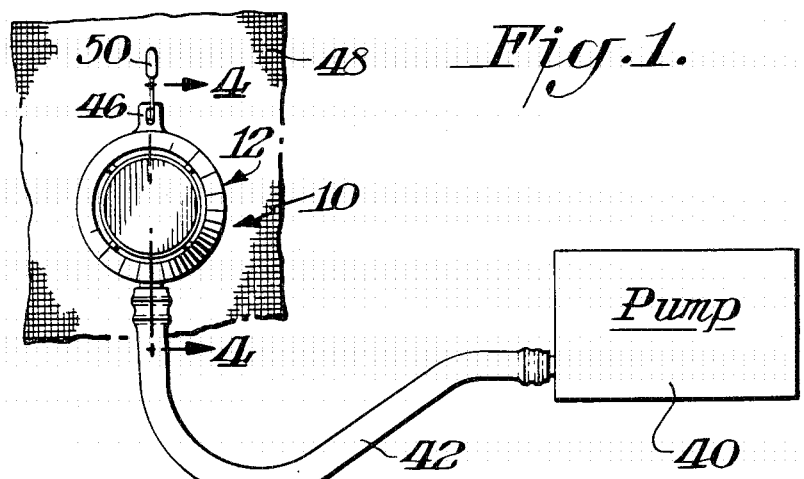
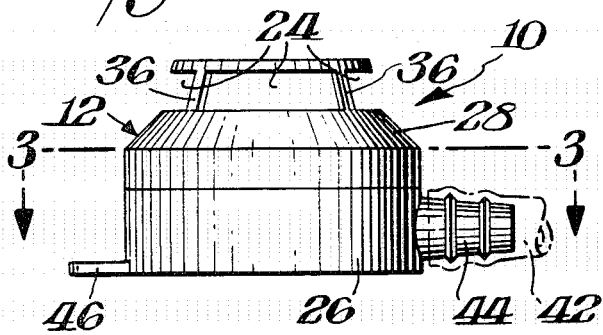
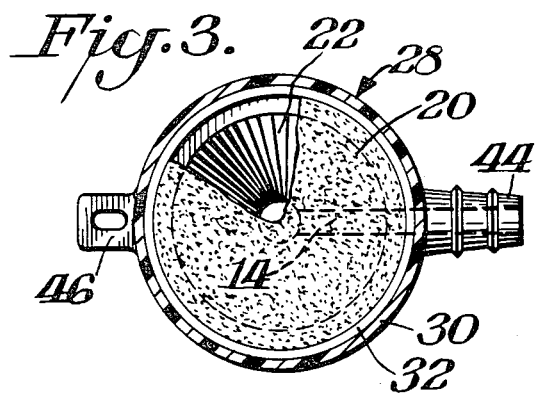
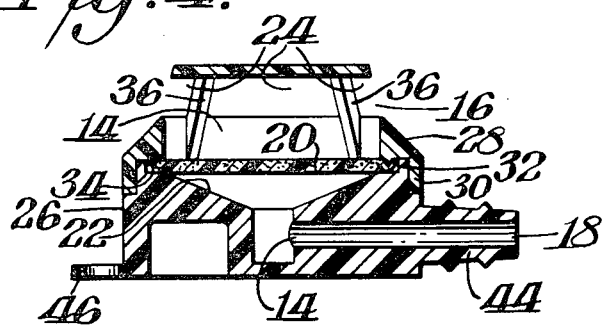
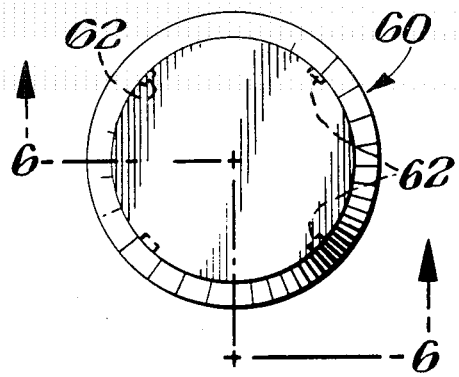
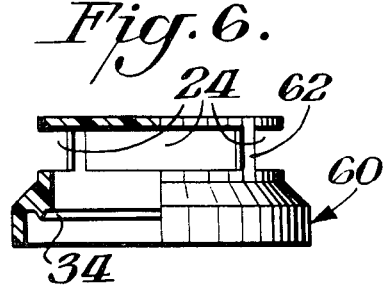

FILTER CASSETTE

BACKGROUND OF THE INVENTION

The present invention relates to a filter cassette, and more particularly to a self-contained personal filter cassette for the sampling of substances in the air.

In many instances, airborne substances are collected for the purpose of assessing the potential risk to the health of persons arising from the inhalation of such substances at their places of work. Over the years, a wide variety of approaches have been suggested for collecting such samples. The physical act of sampling airborne substances generally involves the removal of a portion of the surrounding air by suction, and the analysis of the airborne substances thus aspirated. The airborne substances so collected are analyzed for concentration, composition and size distribution and such information is extremely useful in health hazard analysis and air pollution studies.

At present, two general types of filter cassettes are used for obtaining samples of airborne substances for subsequent analysis. These are the closed-face or in-line cassette and the open-face cassette. The open-face cassette has an inherent disadvantage in that it can easily be tampered with by the curious wearer. Additionally, the open-face cassette is easily exposed to splash and other interference from energetic processes, and it is easily contaminated when hung, facing down, directly next to a worker's clothing. While the closed-face cassette is not as easily tampered with or contaminated, as is the open-face cassette, the airborne substances collected on the filter medium in this cassette are unevenly distributed. The substances collected on the filter tend to accumulate directly behind the intake orifice thereby preventing certain tests from being performed on the sample. For example, analyses, such as polarized light microscopy, X-ray diffraction, and X-ray fluorescence analysis, cannot be done directly on the filter medium. Also, during gravimetric analysis, some of the airborne substances collected are easily dislodged and possibly lost from the filter medium surface since the substances tend to cake on the filter in one small area. Accordingly, there is real need for a filter cassette which collects uniform distributions of the airborne substances but which is free of the deficiencies inherent in the totally open-face cassette.

U.S. Pat. Nos. 3,693,410, 3,957,469 and 3,983,743 describe filter cassettes known in the art.

SUMMARY OF THE INVENTION

Accordingly, it is an object of the present invention to provide a filter cassette for the sampling of airborne substances which is simple in construction and highly effective in collecting a sample for analysis.

In accordance with the present invention, a filter cassette for the sampling of airborne substances comprises a body section having an air flow passageway extending therethrough from an air inlet to an air outlet. A filter medium is located inside the body section where it is disposed across the air flow passageway for capturing the airborne substances. The passageway portion directly downstream from the filter medium has a uniform frusto-conical contour converging in the direction of flow. The air inlet comprises openings in the body section upstream from the filter medium arranged to direct air into the air flow passageway normal to the direction of flow onto the filter medium.

The body section may include an outside frusto-conical surface in which the air openings are located, the openings being in the form of circumferential slots around the circumference of the outside frusto-conical surface. Alternatively, the body section may include cylindrical surface in which the air inlet openings are located, the openings being in the form of circumferential slots around the circumference of the outside cylindrical surface. Preferably, the body section includes inside and outside portions with a releasable connection between the portions in the form of a friction fit. The filter medium is disposed between the inner and outer portions of the body section, and the outer portion of the body section may include an annular bead next to the peripheral portion of the medium for engaging and holding it in place between the inner and outer portions of the body section.

A pump is connected to the air outlet of the body section for drawing airborne substances into and through the air passageway and onto the filter medium. The pump may include a hose connected to the body section at the air outlet.

Additionally, attaching structure may be provided on the outside of the body section for securing the cassette to the user. Moreover, the body section may be fabricated from thermoplastic material, if desired.

BRIEF DESCRIPTION OF THE DRAWING

Novel features and advantages of the present invention in addition to those mentioned above, will become apparent to those skilled in the art from a reading of the following detailed description in conjunction with the accompanying drawing wherein:

FIG. 1 is a front elevational view of a filter cassette, according to the present invention, the cassette being attached to the clothing of the user and connected to a suitable pump;

FIG. 2 is a left side elevational view of the filter cassette shown in FIG. 1;

FIG. 3 is a sectional view taken along line 3—3 of FIG. 2;

FIG. 4 is a sectional view taken along line 4—4 of FIG. 1;

FIG. 5 is a top plan view of the outer body portion of an alternative filter cassette, according to the present invention; and FIG. 6 is a sectional view taken along line 6—6 of FIG. 5.

DETAILED DESCRIPTION OF THE INVENTION

Referring in more particularity to the drawing, FIG. 1 illustrates a filter cassette 10 for the sampling of airborne substances. The cassette comprises a body section 12 having an air flow passageway 14 extending therethrough from an air inlet 16 to an air outlet 18. A filter medium 20 inside the body section 12 is disposed across the air flow passageway 14 for capturing airborne substances flowing through the passageway, as explained more fully below. The filter medium may be any suitable filter for the intended sampling, such as a 37 mm. polyvinyl chloride filter with a nominal pore size of 5 $\mu$m. when the airborne substance is coal dust, for example. The passageway portion directly downstream from the filter medium 20 has a uniform frusto-conical contour 22 that converges in the direction of flow. Moreover, the air inlet 16 comprises openings 24 in the body section 12 upstream from the filter medium 20, the openings being arranged to direct air into the air flow passageway 14 normal to the direction of flow onto the filter medium 20.

As best shown in FIGS. 2 and 4, the body section 12 includes an inner portion 26 and an outer portion 28. Outer portion 28 includes a downwardly extending annular collar 30 that tightly fits over an upstanding annular segment 32 on the inner portion 26 of the body section. The interior dimensions of the collar 30 and upstanding segment 32 are such that a friction fit is provided between the inner and outer body portions. This friction fit provides a releasable connection between the portions of the body section. The inner and outer body portions may be fabricated from thermoplastic materials by techniques known in the art, it being understood that other materials and fabrication methods are equally suitable.

As shown best in FIG. 4, the filter medium 20 is sandwiched between the inner and outer portions of the body section. Each of these portions is suitable dimensioned to receive the filter medium. Additionally, the outer portion 28 of the body section 12 includes an annular bead 34 next to the periphery of the filter medium 20 for engaging and holding it in place between the inner and outer portions of the body section.

The outer portion 28 of the body section 12 includes an outside frusto-conical surface 36 in which the air inlet openings 24 are located. As shown best in FIGS. 2 and 4, the openings 24 are in the form of circumferential slots around the circumference of the outside of the frusto-conical surface.

A small self-contained pump 40 is connected to the air outlet 18 for drawing airborne substances through the air passageway 14 onto the filter medium 20. A hose 42 innerconnects the pump 40 with a hose connector 44 surrounding the air outlet 18. The pump may be a Dupont P-4000, constant flow, personal sampling pump, calibrated at 2.0 lpm using a 1.0 liter bubblemeter, for example, it being understood that other pumps are equally suitable. Attaching structure 46 on the inner portion 26 of the body section 12 is provided for releasably securing the filter cassette 10 to the clothing 48 of the user, and a pin 50 innerconnects the clothing 48 with the attaching structure.

FIGS. 5 and 6 illustrate an alternative embodiment of the present invention which is identical to the filter cassette 10 except for a modified outer portion 60. Specifically, outer portion 60 differs from its counterpart 28 in that the portion 60 has a cylindrical surface 62 in which the air inlet openings 24 are located. The inlet openings 24 are also in the form of circumferential slots around the circumference of the outside cylindrical surface 62. Otherwise, outer portion 60 is the same as outer portion 28 and similar reference characters have been even used to identify similar parts.

In operation, the filter cassette 10 of the present invention operates in a very efficient manner to collect a sample of airborne substances. After deciding upon the appropriate filter medium 20, the filter is inserted between the inner and outer portions of the body section 12 as shown in FIG. 4. These portions are then fitted together to anchor the filter medium in place. Next, the filter cassette is attached at its location of use such as to the clothing 48 of the user. This is accomplished by threading the pin 50 through the attaching structure 46 and clothing 48. Following such attachment, the pump

40 and its associated tube 42 are connected to the hose connector 44 surrounding the air inlet 18. Upon activation of the pump, air and airborne particles are drawn into the passageway 14 through the circumferential openings 24 that direct the air and airborne substances into the passageway normal to the direction of flow onto the filter medium 20. The air passes through the filter medium and the airborne substances are collected upon the filter medium. Ultimately the air being drawn through the tube 42 is released at the pump 40.

The frusto-conical contour 22 directly downstream from the filter medium 20 enables a uniform distribution of airborne substances upon the filter medium 20. Also, since the air inlet openings 24 are normal to the flow through the passageway 14, the deposition of airborne substances on the filter medium is not adversely affected by tampering or foreign contamination, such as extraneous splashes in the vicinity of the cassette. Collection of a uniform distribution of airborne substances on the filter medium enables analyses by polarized light microscopy, X-ray diffraction, and X-ray fluorescence, for example. Such analysis can only be performed when the sample collected by the filter is uniformly distributed thereon. Hence, the filter cassette 10 of the present invention eliminates the disadvantages of both the closed-face cassette and the open-face cassette. Tampering and extraneous interference are prevented and a sample of uniform distribution is collected.

What is claimed is:

1. A filter cassette for the sampling of airborne substances which comprises a body section having an outside surface and an air flow passageway extending through the body section from an air inlet to an air outlet, a filter medium inside the body section disposed across the air flow passageway for capturing airborne substances flowing through the passageway, the passageway portion directly downstream from the filter medium having a uniform frusto-conical contour converging in the direction of flow and the passageway portion downstream from the uniform frusto-conical contour being centrally positioned relative to the filter medium, and the air inlet comprising openings in the body section extending through the outside surface thereof upstream from the filter medium arranged to direct air into the air flow passageway normal to the direction of flow onto the filter medium.

2. A filter cassette for the sampling of airborne substances as in claim 1 wherein the body section includes an outside frusto-conical surface in which the air inlet openings are located, the openings being in the form of circumferential slots around the circumference of the outside frusto-conical surface.

3. A filter cassette for the sampling of airborne substances as in claim 1 wherein the body section includes an outside cylindrical surface in which the air inlet openings are located, the openings being in the form of circumferential slots around the circumference of the outside cylindrical surface.

4. A filter cassette for the sampling of airborne substances as in claim 1 wherein the body section includes inner and outer portions, and a releasable connection between the portions.

5. A filter cassette for the sampling of airborne substances as in claim 4 wherein the releasable connection is a friction fit.

6. A filter cassette for the sampling of airborne substances as in claim 4 wherein the filter medium is disposed between the inner and outer portions of the body section.

7. A filter cassette for the sampling of airborne substances as in claim 6 wherein the outer portion of the body section includes an annular bead thereon next to the peripheral portion of the filter medium for engaging the medium to hold it in place between the inner and outer portions of the body section.

8. A filter cassette for the sampling of airborne substances as in claim 4 wherein the inner section of the body includes a hose connector surrounding the air outlet.

9. A filter cassette for the sampling of airborne substances as in claim 4 wherein the outer portion of the body section includes an outside cylindrical surface in which the air inlet openings are located, the openings being in the form of circumferential slots around the circumference of the outside cylindrical surface.

10. A filter cassette for the sampling of airborne substances as in claim 4 wherein the outer portions of the body section includes an outside frusto-conical surface in which the air inlet openings are located, the openings being in the form of circumferential slots around the circumference of the outside frusto-conical surface.

11. A filter cassette for the sampling of airborne substances as in claim 1 in combination with pump means connected to the air outlet for drawing airborne substances through the air passageway and onto the filter medium.

12. A filter cassette for the sampling of airborne substances as in claim 11 wherein the pump means includes a hose connected to the body section at the air outlet thereof.

13. A filter cassette for the sampling of airborne substances as in claim 1 including attaching means on the outside of the body section for securing the cassette to the user.

14. A filter cassette for the sampling of airborne substances as in claim 1 wherein the body section is fabricated from thermoplastic material.

* * * * *